April 18, 1933.  J. VAN BUREN  1,903,844
MACHINE FOR MAKING CARTONS
Filed July 9, 1929  11 Sheets-Sheet 1

INVENTOR
John VanBuren
BY
Marshall & Hawley
ATTORNEYS

April 18, 1933.  J. VAN BUREN  1,903,844
MACHINE FOR MAKING CARTONS
Filed July 9, 1929    11 Sheets-Sheet 2

INVENTOR
John Van Buren
BY
Marshall Hawley
ATTORNEYS.

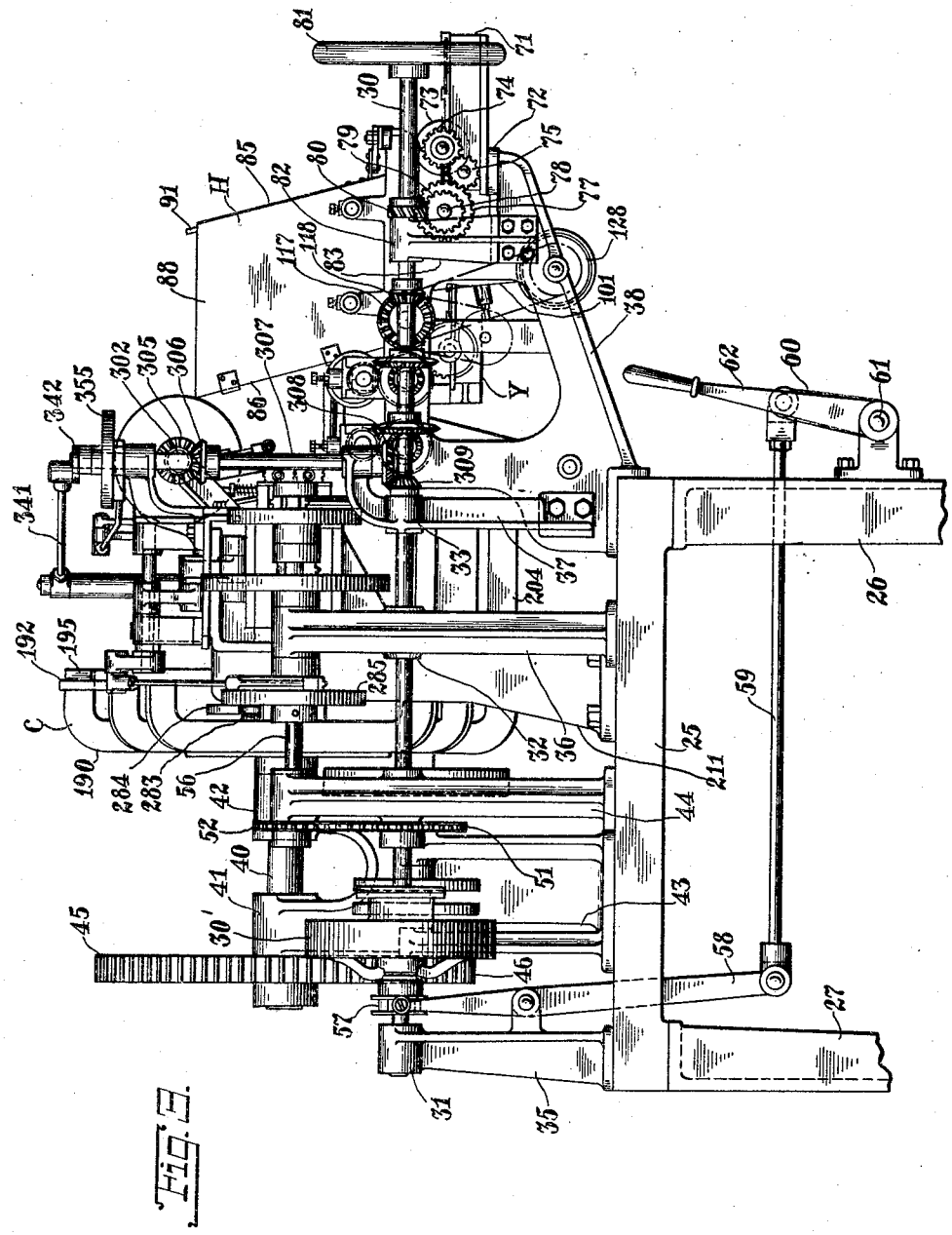

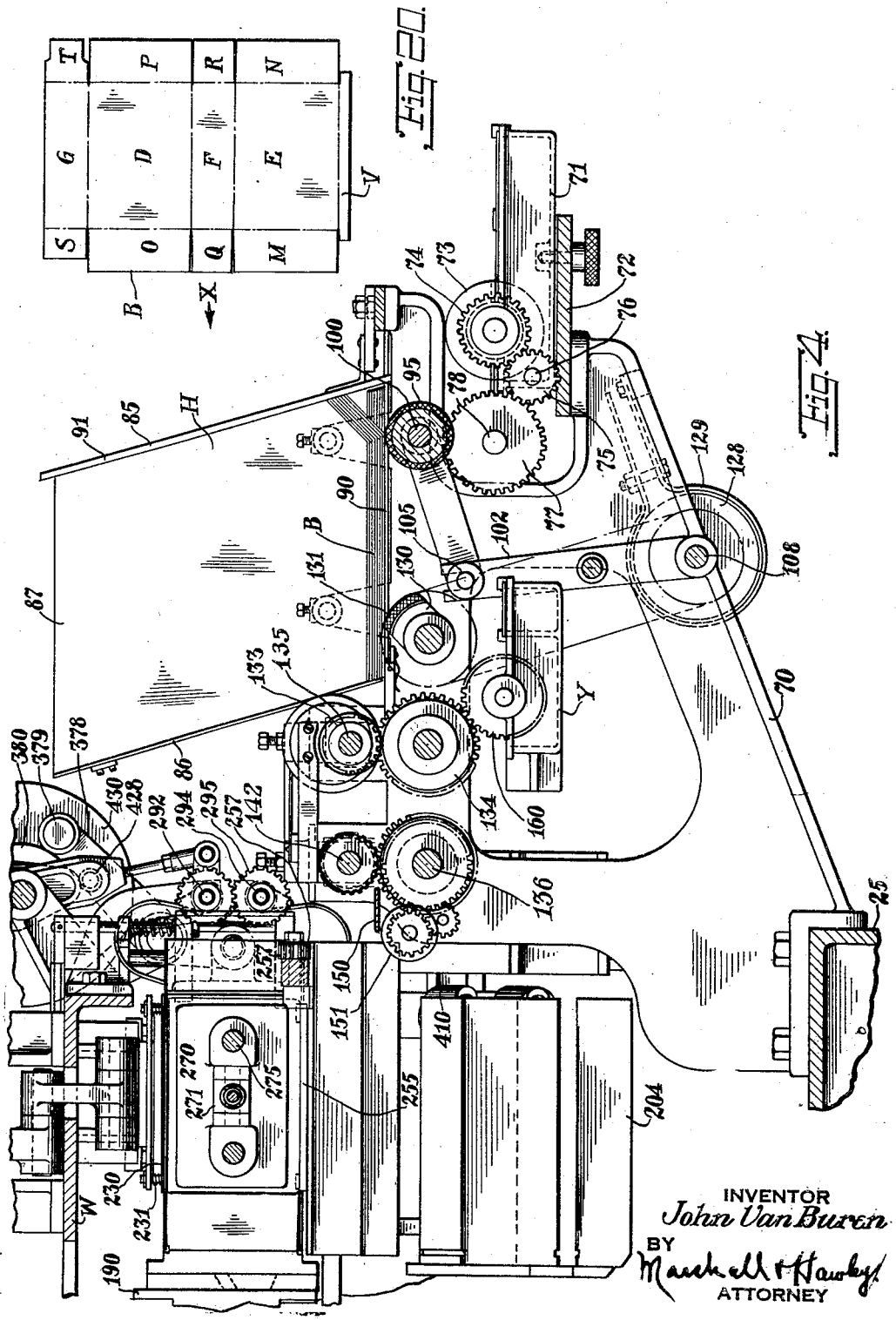

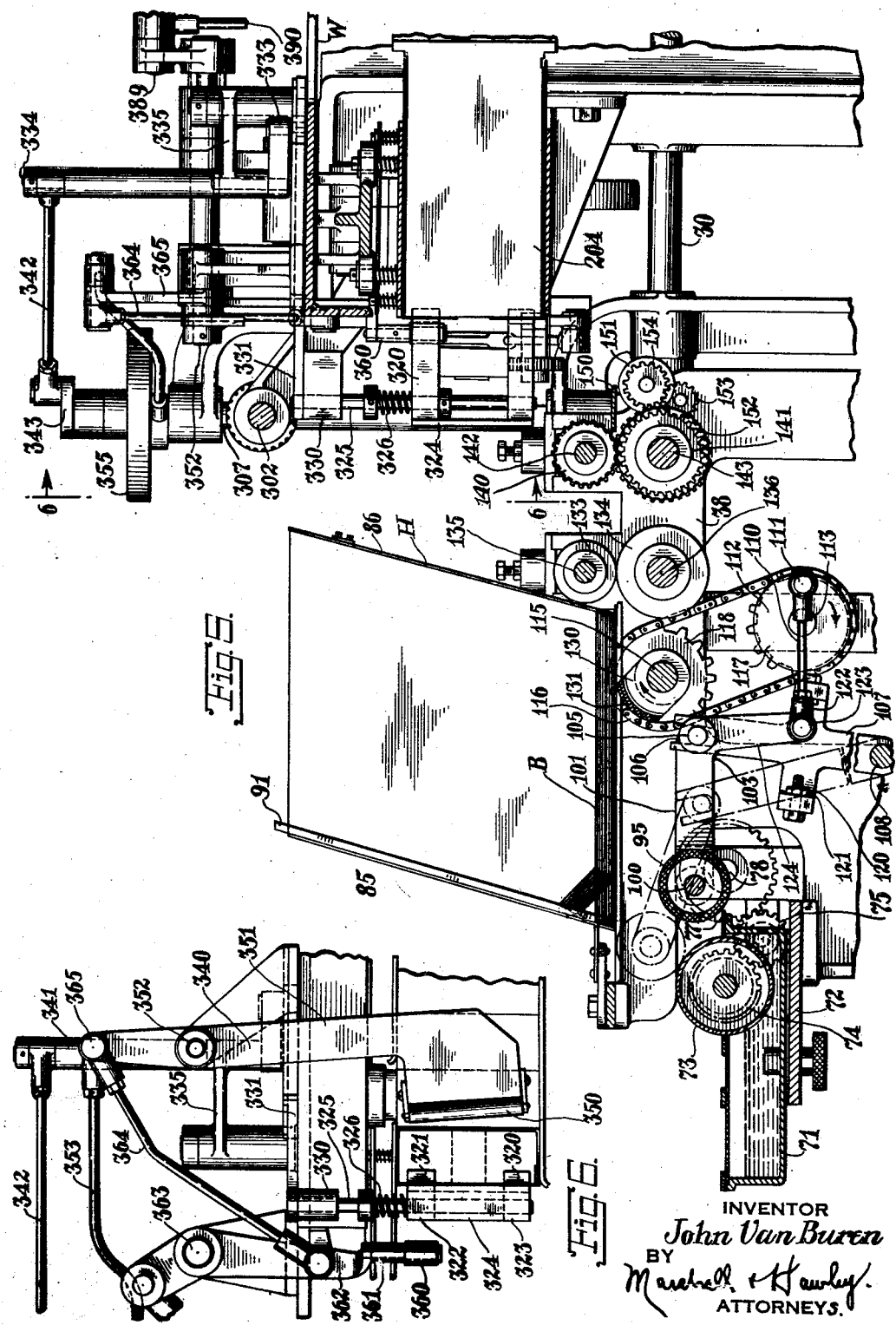

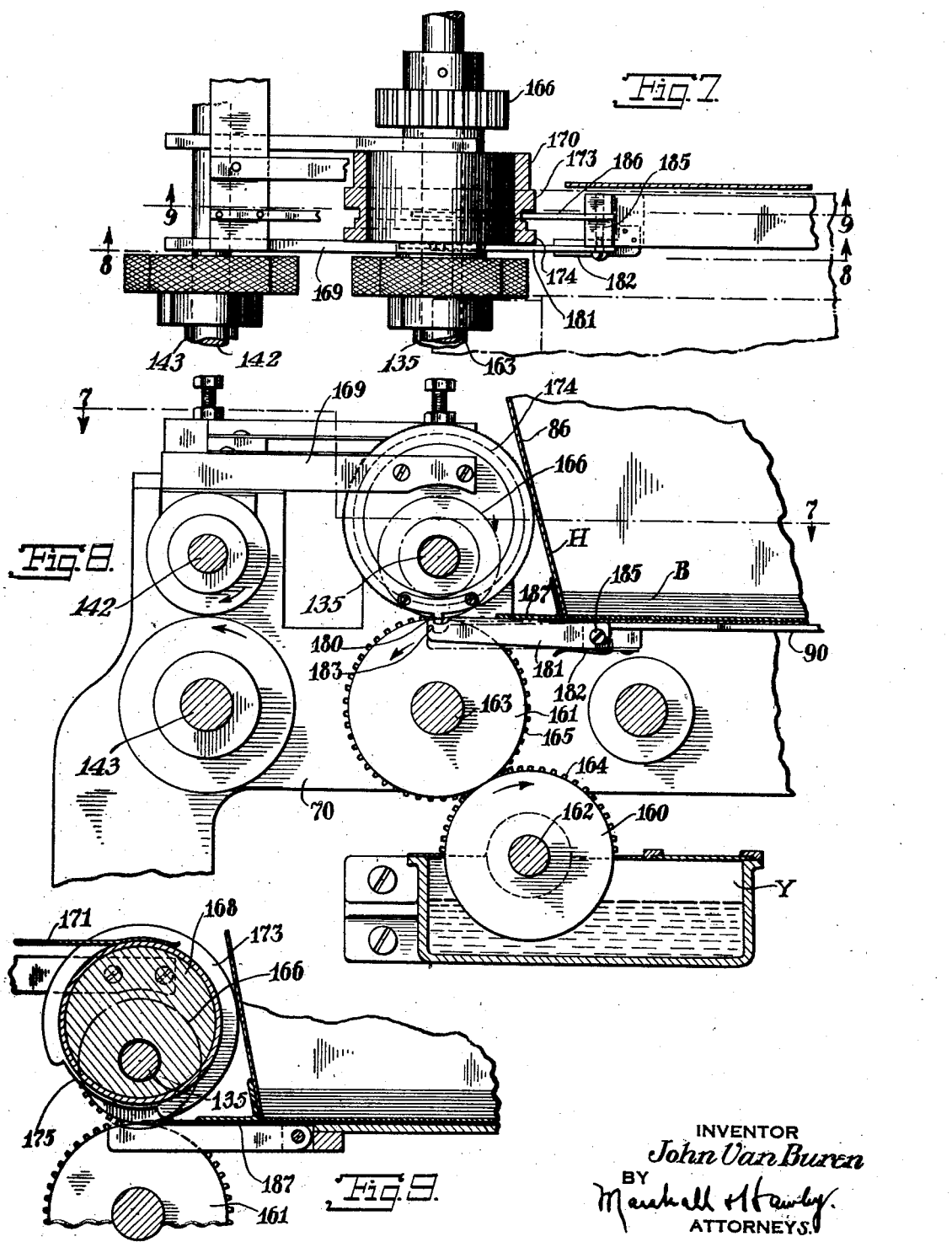

April 18, 1933. J. VAN BUREN 1,903,844
MACHINE FOR MAKING CARTONS
Filed July 9, 1929 11 Sheets-Sheet 7

INVENTOR
John Van Buren
BY
Marshall & Hawley
ATTORNEYS

April 18, 1933.   J. VAN BUREN   1,903,844
MACHINE FOR MAKING CARTONS
Filed July 9, 1929    11 Sheets-Sheet 8

INVENTOR
John Van Buren
BY Marshall & Hawley
ATTORNEYS.

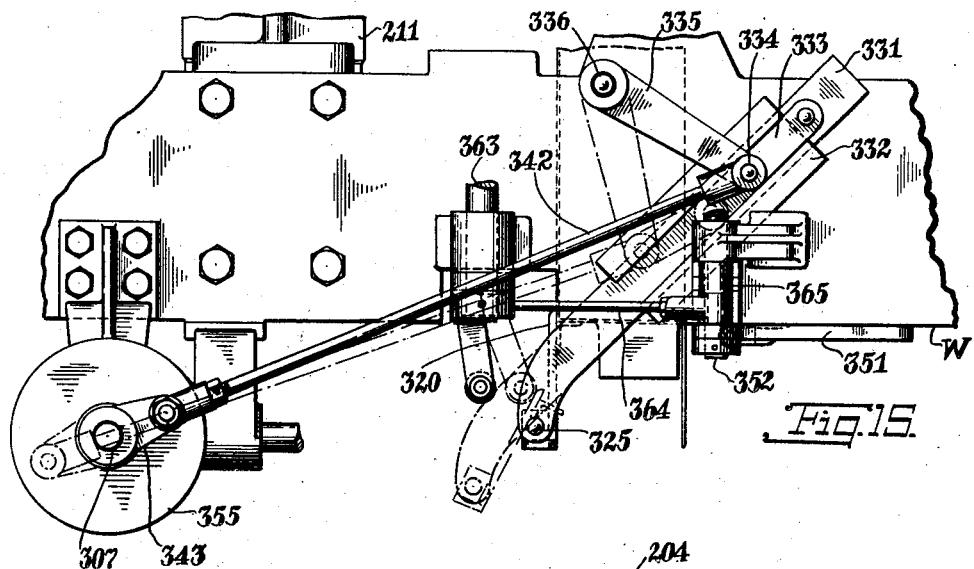
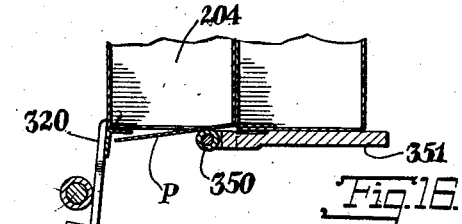
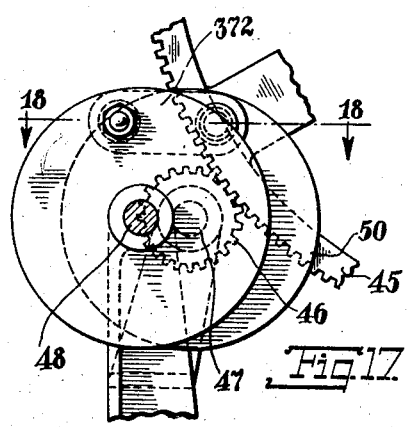
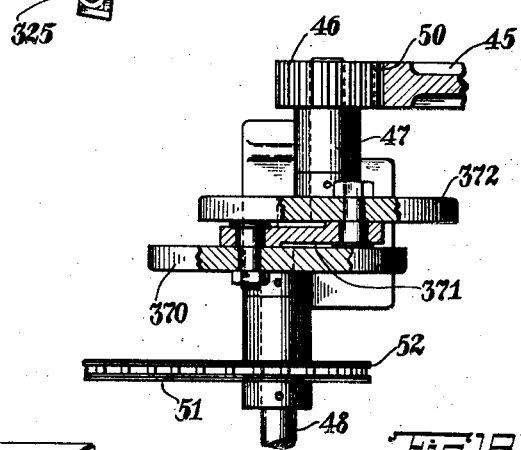
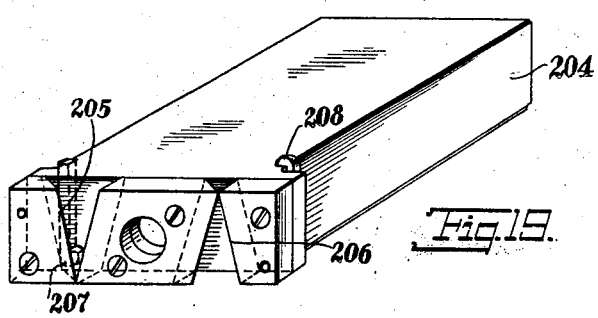

Patented Apr. 18, 1933

1,903,844

UNITED STATES PATENT OFFICE

JOHN VAN BUREN, OF BROOKLYN, NEW YORK

MACHINE FOR MAKING CARTONS

Application filed July 9, 1929. Serial No. 376,919.

This invention relates to a machine for making cartons or boxes.

Most machines for making cartons of heavy paper or cardboard discharge or deliver the cartons flat to facilitate the shipment thereof to the users. When the cartons are thus delivered, both ends are open. However, when the cartons are to be filled by the maker, additional labor is required to open up the flat cartons and close and secure one end thereof prior to the filling operation. It is therefore desirable, under such circumstances, that the cartons be delivered from the machine with one end closed and the other end open. It is then necessary merely to fill the box through the open end and to close and seal that end.

This invention has for its salient object to provide a carton manufacturing machine constructed and arranged to deliver the cartons in condition for filling.

Another object of the invention is to provide a machine so constructed and arranged that the blanks will be folded, glued and discharged with one end open at a maximum rate of speed.

Another object of the invention is to provide a machine of the character described, so constructed and arranged that the path of the cartons through the machine is reduced to a minimum length.

Further objects of the invention will appear from the following specification taken in connection with the drawings, which form a part of this application, and in which Fig. 1 is a top plan view of a machine constructed in accordance with the invention;

Fig. 3 is an end elevation of the machine shown in Fig. 1;

Fig. 4 is a sectional elevation taken substantially on line 4—4 of Fig. 1;

Fig. 5 is a sectional elevation taken substantially on line 5—5 of Fig. 1;

Fig. 6 is an elevational view taken at right angles to Fig. 5 substantially on the line 6—6 of Fig. 5;

Fig. 7 is a sectional elevation taken substantially on line 7—7 of Fig. 8;

Figure 1:
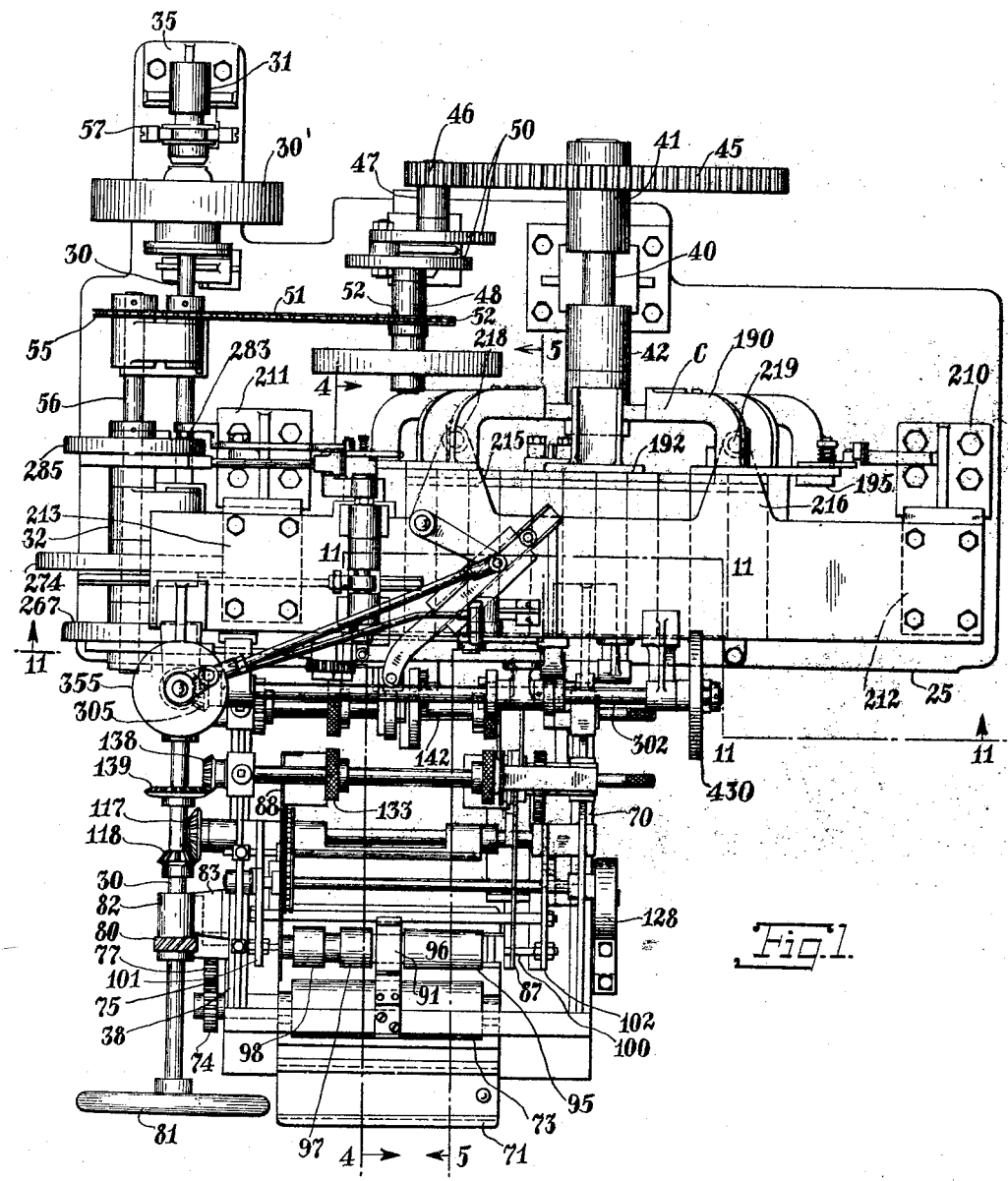
Figure 2:
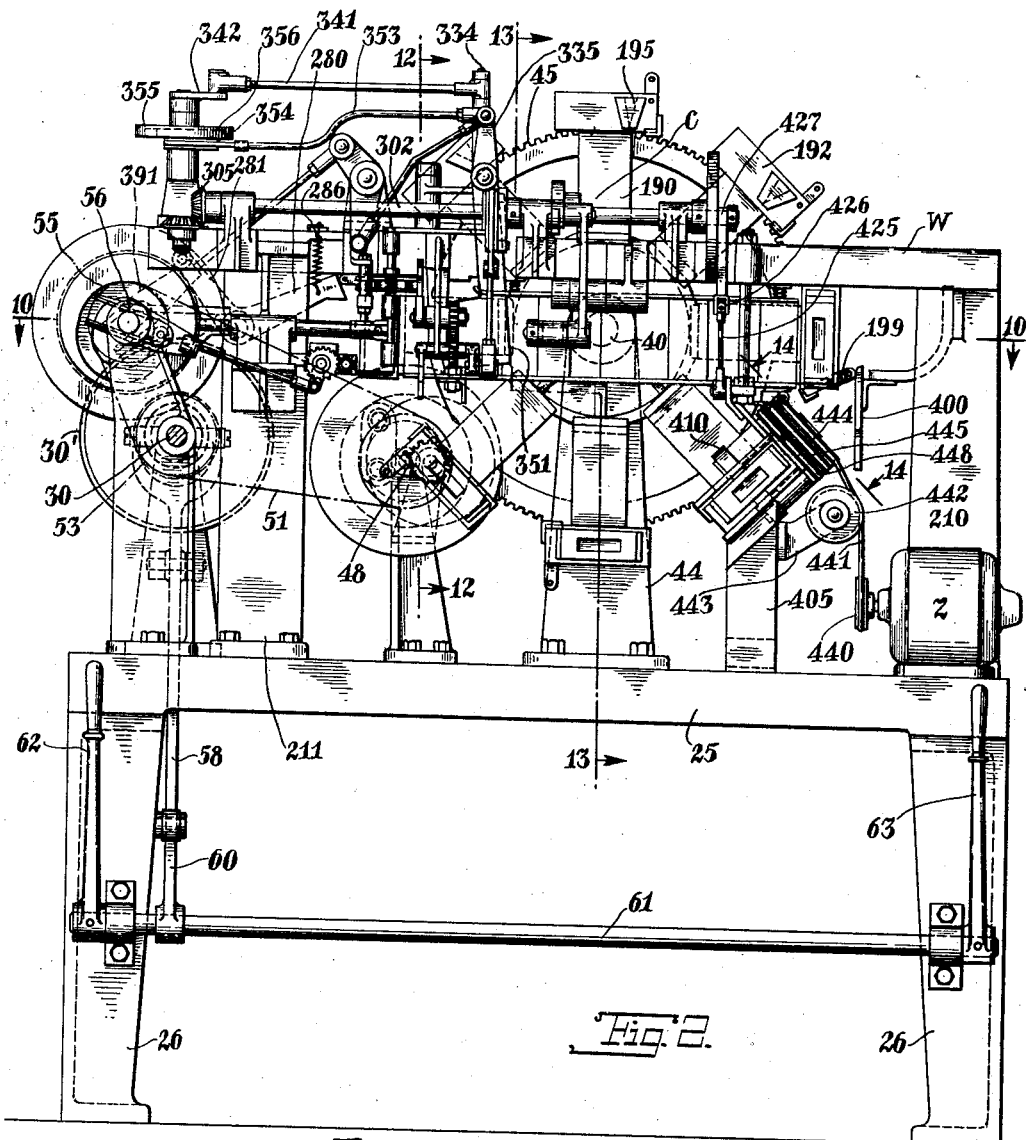
Fig. 2 is a front elevation of the machine shown in Fig. 1, the blank feeding and adhesive applying mechanism being omitted for the sake of clearness.
Figure 14:
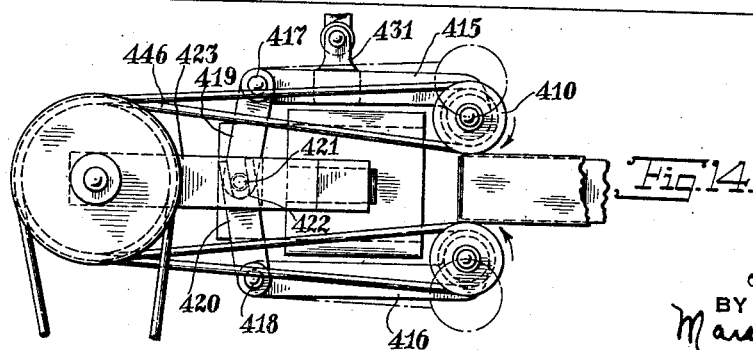
Figure 10:
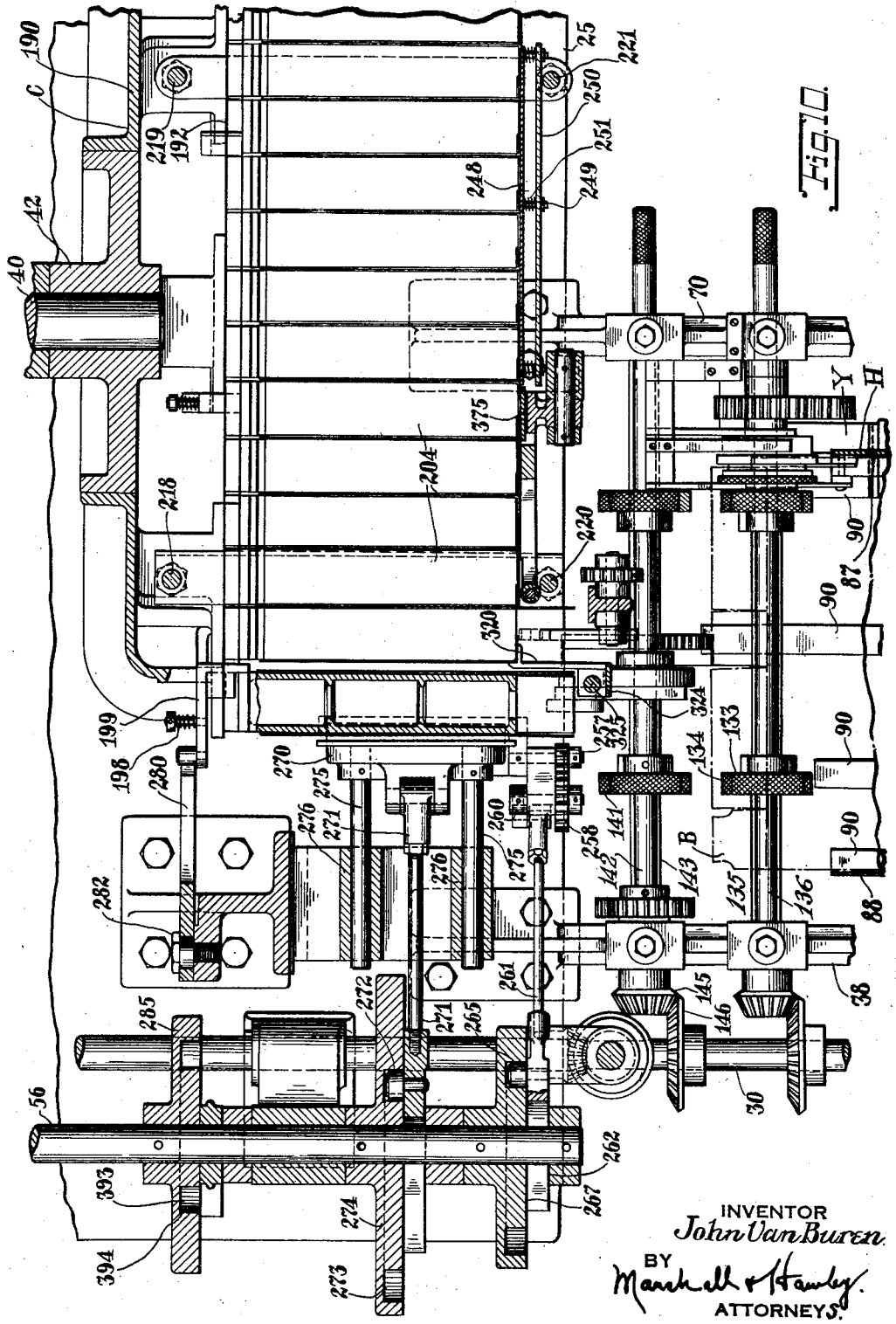
Figure 11:
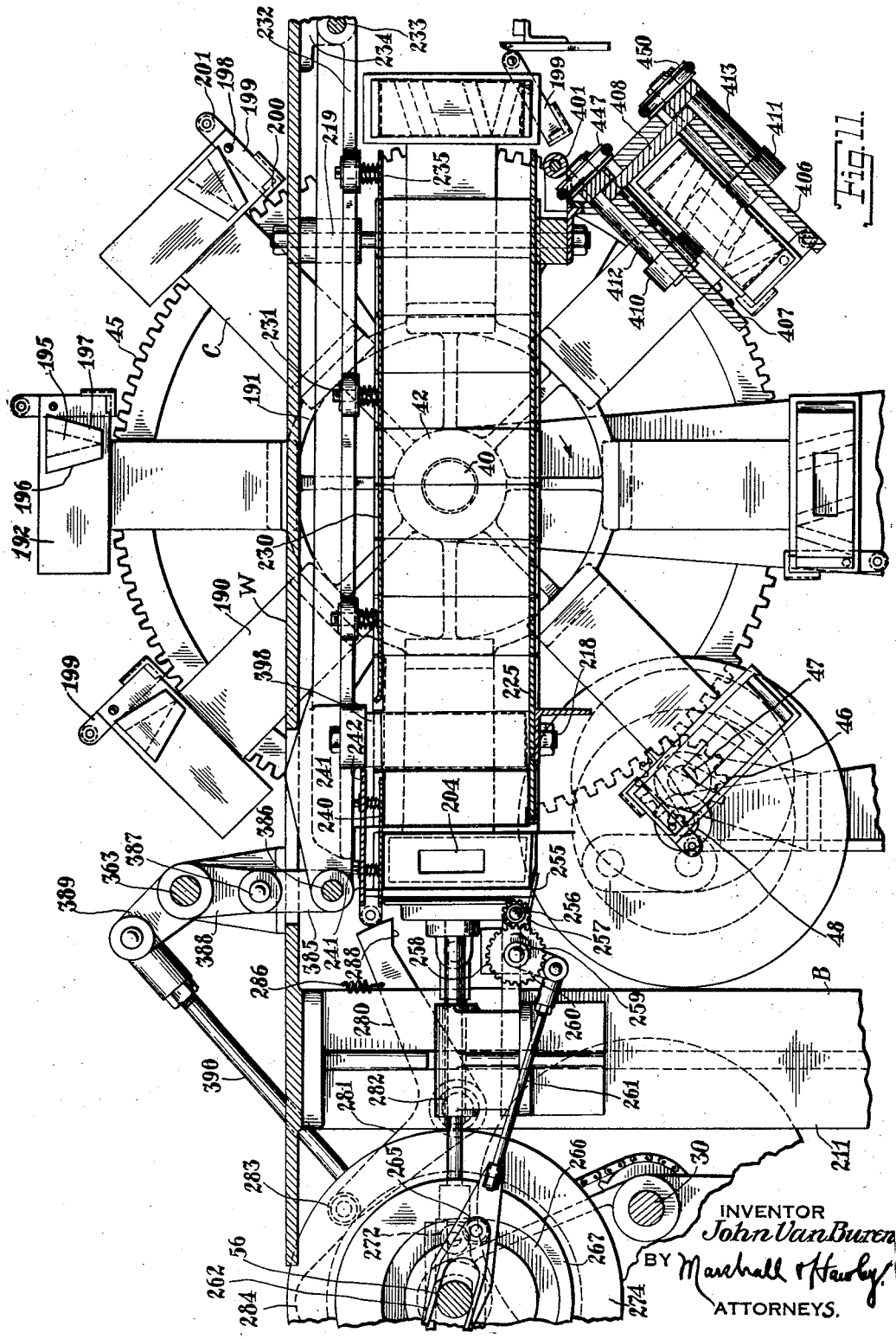
Figure 12:
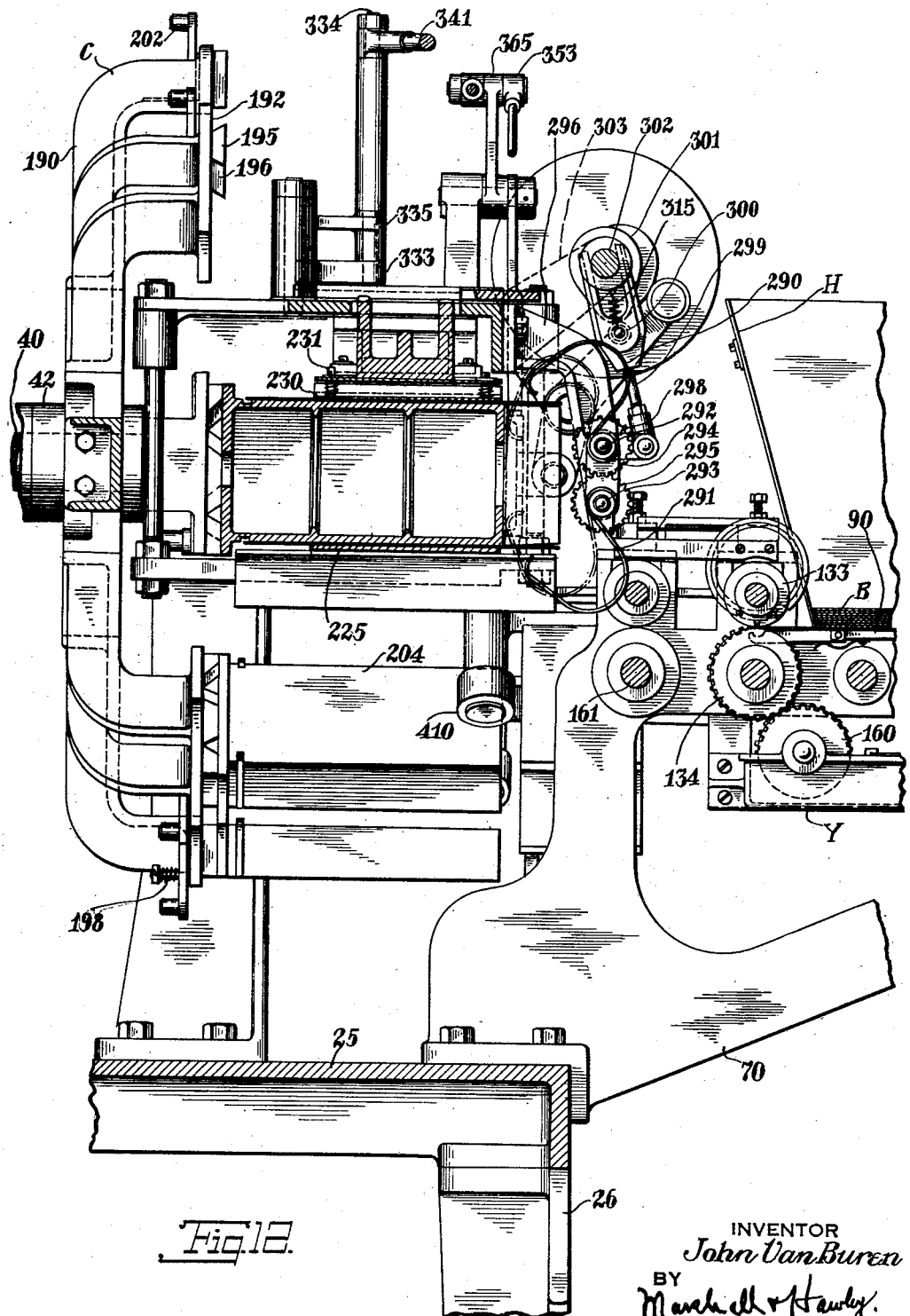
Figure 13:
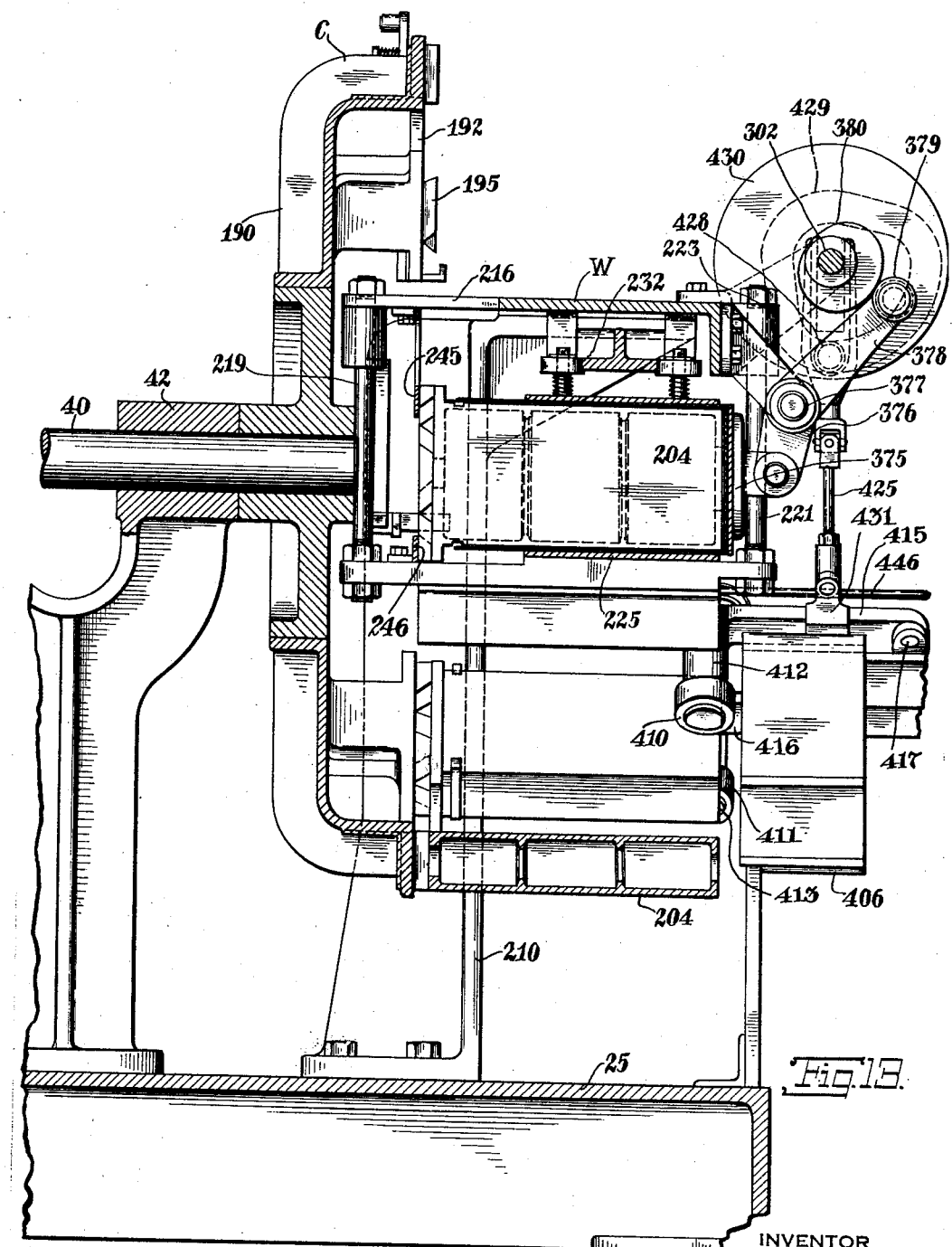

Figs. 8 and 9 are sectional elevations taken substantially on lines 8—8 and 9—9 of Fig. 7;

Fig. 10 is a sectional elevation taken substantially on line 10—10 of Fig. 2;

Fig. 11 is a sectional elevation taken substantially on line 11—11 of Fig. 1, this view being taken on an enlarged scale;

Fig. 12 is an enlarged sectional elevation taken substantially on line 12—12 of Fig. 2;

Fig. 13 is an enlarged sectional elevation taken substantially on line 13—13 of Fig. 2;

Fig. 14 is an enlarged detail elevation showing the feeding mechanism for discharging the boxes or cartons from the machine;

Fig. 15 is a detail plan view showing two positions of the folding mechanism for folding the ends of the blank;

Fig. 16 is a sectional elevation of the folding mechanism for the end flaps, these parts being shown in a different position of movement from those shown in Fig. 15;

Fig. 17 is a detail elevational view, partly in section, showing the fast and slow drive mechanism for the carrier;

Fig. 18 is a sectional elevation taken substantially on line 18—18 of Fig. 17;

Fig. 19 is a perspective view of one of the form blocks on which the blank is folded; and Fig. 20 is a plan view of the blank from which the box or carton is made.

The invention briefly described consists of a machine comprising means for feeding blanks, one at a time, a mechanism for applying adhesive to portions of the blank to be folded and secured, a carrier having mounted thereon a plurality of form blocks, the blank feeding mechanism being adapted to feed the blanks into the path of movement of the blocks. The blanks are folded around the blocks and the blocks with the folded blanks are fed into a transverse guideway which extends diametrically across the circumference of the carrier. During their passage through the guideway, one end of each blank is folded and secured and at the opposite end of the guideway each form block with the folded carton thereon is again positioned on the carrier and is fed with the carrier into a position in which the carton is engaged by discharging or ejecting mechanism which removes the carton from the form block. The invention further involves various features in the blank feeding mechanism, adhesive applying mechanism, folding mechanism, and ejecting or discharge mechanism which will be more fully described in the following specification.

Further details of the invention will appear from the following description.

Machine frame and main driving connections

The machine is carried by a table 25 mounted on legs or supports 26 and 27. The main power shaft 30 has a pulley 30' thereon which receives power from any suitable source. The shaft 30 is mounted in bearings 31, 32 and 33 carried by bearing brackets or supports 35, 36 and 37. The brackets 35 and 36 are secured to the table or bed plate 25, and the bracket 37 is secured to and carried by a frame member 38 which is secured to the table 25 and extends forwardly thereof.

The blank feeding and adhesive applying mechanism is driven by suitable driving connections hereinafter described, with the shaft 30. After the blanks are fed and adhesive has been applied thereto, they are folded around form blocks detachably mounted on a carrier C, which in turn is mounted on a shaft 40 carried by bearings 41 and 42 formed in bearing brackets 43 and 44. The shaft 40 has secured to one end thereof a spur gear 45 which is driven by a gear 46 carried by a stub shaft 47, which in turn is driven from a shaft 48 through a fast and slow driving connection 50 hereinafter described. The shaft 48 is driven by a chain 51 and sprocket 52, the chain being driven by a sprocket 53 mounted on the shaft 30. The chain 51 also drives a sprocket 55 mounted on a shaft 56 on which are mounted operating cams for the various parts of the mechanism hereinafter described. A clutch 57 is disposed between the driving pulley 31 and the shaft 30, the clutch being controlled by a lever 58 which in turn is controlled by a link 59 connected at its front end to an arm 60 mounted on a shaft 61. The shaft 61 has a pair of arms 62 and 63 at the ends of the machine, by means of which the clutch can be shifted in and out.

Blank feeding and adhesive applying mechanism

The blank feeding and adhesive applying mechanism is carried by a frame comprising the frame member 38 and a corresponding frame member 70 disposed parallel thereto and secured to the table or base plate 25.

The adhesive or glue is disposed in a pan 71 secured on a support 72 carried by the frame members 38 and 70. A roller 73 is mounted to rotate in the adhesive and is driven by a gear connection 74, 75 from an idler shaft 76, the gear 75 meshing with the gear 77 mounted on a shaft 78. The shaft 78 has a worm gear 79 which meshes with a worm 80 mounted on the shaft 30. Thus the glue roller 73 will be rotated continuously whenever the main driving shaft 30 is driven. A wheel 81 is secured to the front end of the shaft 30 so that the machine can be turned over by hand when desired. The front end portion of the shaft 30 is supported by a bearing 82 carried by a bearing bracket 83 which is secured to the frame member 38.

The blanks B are supported in a hopper H which is secured in any suitable manner to the frame members 38 and 70. The hopper comprises inclined front and rear walls 85 and 86, side walls 87 and 88, and the bottom of the hopper comprises a plurality of strips 90. The strips are so placed as to permit the glue applying roller to engage the portions of the blank to which glue is applied.

The front wall 85 of the hopper has an upwardly extending bar 91 intermediate the edges thereof and adapted to engage one of the end flaps of the blank shown in Fig. 20 in a manner hereinafter described.

The blank comprises side sections D and E, an end section F intermediate the sections D and E, and an end section G at one end of the section D. At the ends of the section E are end flaps M and N and at the ends of section D are flaps O and P. Tabs Q, R, S and T are disposed at the ends of the sections G and F and a narrow flap V extends along the free end of the section E. The blank shown in Fig. 20 is fed into the machine flat in the direction of the arrow X. When the blanks are placed in the hopper H, the tabs R engage the bar 91 and are bent upwardly, as clearly shown in Figs. 4, 5 and 6. The object of the bar 91 is to increase the friction between successive blanks. With this arrangement when the feeding mechanism hereinafter described feeds the blanks to the folding devices, only one blank will be fed at a time, since a greater pull is required to move or feed the second blank than is required to feed the bottom blank. The folds between the tabs R and the remaining portions of the blanks supply sufficient friction to prevent the feeding of more than one blank at a time.

The glue or adhesive is fed to the flaps N and P by an adhesive applying roller 95 which comprises sections 96, 97 and 98. The roller 95 is carried by a shaft 100 which is carried by arms 101 and 102, arm 101 forming part of a bell crank lever 103. The bell crank lever is mounted to swing about a pivot shaft 105, which is in turn mounted in a notch 106 formed in an arm 107 mounted on a stub shaft 108. One end of the bell crank lever 103 is connected by a connecting rod or pitman 110 to a pin 111 carried by a disk 112 mounted on a shaft 113. The shaft 113 is driven from a shaft 115 by a chain 116 and sprocket wheels 117 and 118 carried respectively by the shafts 113 and 115. Shaft 115 is driven from the shaft 30 by a bevel gear connection 117, 118.

The arm 107 has a cross arm 120 connected thereto provided with stops 121 and 122 adapted to be engaged by a stud 123 which projects laterally from the lower arm 124 of the bell crank lever 103.

The stub shaft 108 has a collar 128 secured thereto which is embraced by a friction brake band 129.

The adhesive applying roller 95 is actuated by the foregoing driving connections in a manner to roll beneath and apply adhesive to the flaps N and P and then to move downwardly into contact with the roller 73 and to roll partially around the periphery of the roller 73 and then move rearwardly and upwardly to engage the flaps N and P of the next blank. This path of movement is obtained in the following manner: When the pin 111 moves in a clockwise direction, as indicated on Fig. 5 by the arrow, the bell cranks and the arm 107 will move as a unit to the dotted line position shown in Fig. 5, until the stud 123 engages the stop 121. Thereafter the bell crank levers carrying the shaft 100 will swing on the fulcrum or pivot 105 and cause the roller 95 to engage the adhesive roller or glue roller 73. The roller 95 will remain depressed during the retraction of the arm 107 and bell crank levers and will thereafter move upwardly to the position shown in full lines in Fig. 5 and repeat the operation. The feeding mechanism is so timed that when one blank is being fed from the hopper, adhesive will be applied to the flaps N and P of the next blank. The adhesive applying roller 95 is formed with a gap between the sections 97 and 98 to permit the feeding mechanism hereinafter described to engage and feed the blanks without contacting with the adhesive thereon. The portions 97 and 98 apply adhesive only to the two end portions of the flap N since the tabs R and T are secured only to these portions and the central portion of the flap N is not covered.

*Blank feeding mechanism*

The blanks are fed from the hopper H by means of an intermittently operatable arcuate feeding member 130 mounted on the shaft 115. The member 130 is preferably provided with a surface 131 of rubber or other suitable friction material.

As the blanks are fed from the hopper by the feeding member 130, they pass between two set of feeding disks 133 and 134 carried respectively by shafts 135 and 136. The shaft 136 is driven from the shaft 30 by a bevel gear driving connection 138, 139.

From the sets of feeding disks 133, 134, the blanks are fed between a second set of feeding disks, each comprising a pair of disks 140 and 141 mounted on shafts 142 and 143. The shaft 143 is driven from the shaft 30 by a bevel gear connection 145, 146. The blank feeding mechanism comprising the disks 33 and 134 and 140 and 141 feeds the blanks at an increased rate of speed. After the blanks leave the second set of feeding disks, they pass between a bar 150 and a feeding disk 151 which is disposed beneath the bar and is driven from the shaft 143 through a gearing connection 152, 153, 154.

The adhesive applying mechanism already described applies the adhesive to the end flaps N and P. It is necessary, however, to also apply adhesive to the under surface of the section G of the blank. This is done in the following manner: A receptacle Y of suitable adhesive or glue is supported between the frame members 38 and 70, attention being directed particularly to Figs. 4 and 8. A glue roller 160 rotates in the receptacle and transfers the glue to a roller 161, these rollers being mounted respectively on shafts 162 and 163. Shaft 162 has a gear 164 thereon which meshes with the gear 165 on the shaft 163. Gear 165 in turn meshes with the gear 166 mounted on the shaft 135. Thus the drive is communicated from the shaft 135 to the shaft 163 and thence to shaft 162 and the rollers 160 and 161 will be rotated whenever the machine is in operation.

The mechanism for applying glue to the section G of the blank is so constructed and operated that adhesive or glue will be applied only to the section G and will not be applied to the end flaps S and T in alinement therewith. This is accomplished by means of the construction illustrated particularly in Figs. 7, 8 and 9. Briefly stated, this is accomplished by holding the flaps S and T of the blank out of contact with the glue applying roller 161 when these portions of the blank pass over this roller and by holding the section G of the blank in contact with the roller 161 as this portion passes over the roller.

In order to accomplish these functions a cylindrical bearing or support 168 is supported by an arm 169 secured to the frame of the machine, the bearing 168 being stationary. In the particular machine illustrated in the drawings, the shaft 142 passes through the bearing 168 and rotates therein, there being no connection between these parts.

A sleeve 170 is rotatably mounted on the bearing 168 but is normally held against rotation by a friction brake 171 carried by the machine frame. The sleeve 170 has formed thereon a pair of annular collars 173 and 174, the collar 173 being disposed above the adhesive applying roller 161. The collar 173, as shown in Fig. 9, has a notch or recess 175 in its periphery.

The collar 174, as shown particularly in Fig. 8, has secured thereto and projecting beyond the periphery thereof, a lug 180. The lug 180 is disposed in a plane transverse to the sleeve substantially bisecting the recess or notch 175 in the collar 173.

A latch 181 is pivotally carried by the hopper and is pressed upwardly by a spring 182. The free end of the latch has a hook 183 adapted to engage the lug 180 and prevent the rotation of the collar 174 and sleeve 170 on which the collar is formed. The latch 181 is carried by a pin 185, on which is also mounted a guide strip 186, which is movable with the pin 185. A guiding lug 187 is carried by the hopper frame and extends rearwardly therefrom to guide the blanks to the glue applying mechanism just described.

The mechanism just described operates as follows: When a blank is fed from the hopper it will be guided along the upper edges of the latch 181 and guide strips 186, and the front edge of the flap S will depress the latch 181 and engage the lug 180, thus starting the sleeve in its rotation. Since the lug 180 is disposed in a plane substantially central of the notch 175, half of the notch will be disposed above the adhesive applying roller 161 during the passage of the flap S above this roller. Thus the flap will not be pressed downwardly into engagement with the glue applying roller. However, when the periphery of the collar 173 reaches a position above the glue applying roller 161, the section G of the blank will be pressed into contact with this roller and will receive adhesive therefrom. After the section G has passed over the glue applying roller 161, the other half of the recess 175 will be disposed opposite the glue applying roller and no adhesive or glue will be applied to the tab T. The latch 181 will then engage the lug 180 and stop the rotation of the sleeve until the next blank is fed. The collar 174 will, under ordinary conditions due to its momentum, return to a position of rest in which the latch 183 engages the lug 180. However, if the collar did not reach this position the next succeeding blank fed from the hopper would engage the lug 180 and rotate the collar to a position in which the lug would be engaged by the latch. When the blank has released the latch and engaged the lug 180 the collars 173, 174 and the sleeve 170 are rotated thereby. As soon as the periphery of the collar 173 reaches a position above roller 161 the friction of the blank against the collar will cause it to rotate.

From the foregoing description it will be seen that the adhesive will be applied to the section G but will not be applied to the tabs S and T.

*Blank folding and carton forming mechanism*

After the blanks have been fed from the hopper and adhesive has been applied thereto, they are fed into the path of movement of form blocks around which they are folded and formed into cartons.

The form blocks 204 are mounted on arms 190 which extend radially from a carrier 191 mounted on the shaft 40. This construction is particularly illustrated in Figs. 2, 11, 12 and 13. The outer end of each arm 190 is bent laterally or parallel to the shaft 40 and has formed on its extremity a flat face 192 which is disposed in a plane at right angles to the axis of the shaft 40. Each of the flat surfaces 192 has formed thereon and projecting laterally therefrom, a V-shaped lug 195 having undercut edges 196 and 197. Each outer face 192 also has pivoted thereon at 198, a latch 199 having one end 200 which extends over the inner edge of the face 192, and the opposite end 201 is provided with a roller or lug 202 which projects laterally therefrom.

Each of the form blocks is substantially rectangular in shape and corresponds in form to the box or carton to be made thereon. Each block 204 has at one end thereof a pair of V-shaped undercut notches 205, 206, one notch extending in one direction and the other extending in the opposite direction. This construction is particularly shown in Fig. 19. These notches are so proportioned as to receive the lugs 195 carried by the arms 190. Each of the blocks also has extending in opposite directions from the two ends thereof, lugs 207 and 208, the purpose of which will be hereinafter set forth.

As illustrated particularly in Figs. 2 and 11, the blanks are fed into the path of movement of the form blocks. When each blank is held by the feed roller 151 and bar 150, a block will move upwardly beneath the blank and the blank will be carried upwardly thereby to the position shown in Fig. 11. In this position the two sides and one end are folded around three sides of the block.

After a block and the blank thereon has reached the position shown in Fig. 11, the block and blank are transferred to a transverse or substantially horizontal guideway. This guideway and the operating parts for the folding mechanism are carried by a frame member W supported on brackets or vertical posts 210 and 211. The frame member W is L-shaped in section, as shown in Fig. 13, and is supported on flanges 212 and 213 carried by the posts or brackets 210 and 211. The horizontal portion of the frame member W has a pair of rearwardly extending lugs 215 and 216, to which are secured rods 218 and 219. Corresponding rods 220 and 221 are carried by and depend from brackets 223 which are secured to the frame member W.

The lower ends of the rods 218 and 210 and of the rods 219 and 221 are connected by cross bars on which is supported a plate 225 which forms the bottom of the guideway.

The top of the guideway is formed by a plate 230 carried by spindles or rods 231, which in turn are slidably mounted in an arm 232 pivoted at 233 to a lug 234 which is secured to and extends downwardly from the horizontal portion of the frame member W. A spring 235 surrounds each of the spindles or rods 231 and tends to force the plate 230 downwardly into engagement with the upper edges of the cartons as they pass through the guideway.

The entering portion of the guideway also has a plate 240 carried by pins or posts 241, which in turn extend through and are carried by a transverse plate 242 supported by the bar 232. Attention is directed to the fact that there is a space above the guideway between the rear edge of the plate 240 and the front edge of the plate 230. The object of leaving this space will be hereinafter explained.

The rear face of the guideway is formed by longitudinally extending bars 245 and 246 and a portion of the front of the guideway is formed by a plate 248 carried by pins 249 which are slidably mounted in a fixed support or frame member 250. Springs 251 press the plate 248 against the closed ends of the cartons carried by the blocks 204.

When one of the blocks 204 moves upwardly it engages one of the blanks held by the feed roller 150 and bar 151. The blank will be carried upwardly by the block to the position shown in Fig. 11. In this position the edge flap V is folded around the lower edge of the block by means of an oscillatory folding plate 255 which is carried by a shaft 256 having thereon a gear 257 which meshes with a gear 258 mounted on a shaft 259. The shaft 259 has a crank arm 260 to which is connected a pitman or connecting rod 261 having a forked end 262 which straddles the shaft 56. The connecting rod also has projecting laterally therefrom, a roller 265 which is positioned in a cam groove 266 formed in a cam 267 mounted on the shaft 56.

The operation of the folding plate 255 is so timed that this plate will be moved upwardly to fold the flap V of each blank when the blank has been moved to the position shown in Fig. 11 with the form block by which it is carried.

After the block and the blank thereon are positioned as shown in Fig. 11, the block and blank are moved into the guideway by a plunger 270 which is actuated by a connecting rod 271 having a roller 272 positioned in a cam groove 273 formed in the cam 274 mounted on the shaft 56. The plunger 270 is guided in its reciprocatory movement by rods 275 which are slidably mounted in bearings 276.

Before the block can be released from its support on the carrier, the latch 199 which engages over the edge of the block must be tripped. This is accomplished by a bell crank lever comprising arms 280 and 281 and mounted on a fixed pivot 282. The rear end of the bell crank lever or the arm 281 has a roller 283 projecting laterally therefrom and disposed in the path of a cam 284 which is secured to and projects laterally from a cam 285. The roller is maintained in position to engage the cam by a spring 286 which engages the arm 280. When the cam 284 engages the roller 283, the bell crank lever will be moved in a clockwise direction, viewing Fig. 11, and the under surface 288 will engage the roller 201 on the latch and swing the latch in an anti-clockwise direction, thus releasing the block carried by the arm on the carrier. The block and the blank thereon are then moved into the guideway.

As the block and carton are fed between the upper plate 240 and the lower plate 225, the section G of the blank will be folded over the flap V, as shown in Fig. 11. Both ends of the carton are open in this position thereof.

After the block and the blank thereon are fed to the second position from the left in Fig. 11, the end tabs R and T are first folded inwardly and thereafter the flaps N and P are folded successively. This is accomplished by the following folding mechanism. The tabs R and T are folded by means of curved arms 290 and 291 (see Fig. 12) carried by spindles or shafts 292 and 293 having thereon gears 294 and 295. The shafts 292 and 293 are mounted in a bracket 296 which is secured to and depends from the frame member W.

Shaft 292 has connected thereto an arm 298 to which is connected a pitman or connecting rod 299 having a roller 300 which engages a cam 301 carried by a shaft 302 mounted in suitable brackets 303 secured to the frame member W. The shaft 302 has connected to one end thereof a bevel gear 305 which meshes with a gear 306 carried by a vertical shaft 307 having on its lower end a bevel gear connection 308, 309 with the shaft 30.

A spring 315 holds the roller 300 against the cam 301. As the cam rotates, the arms 291 and 292 will be oscillated, and during their inward movement will fold the tabs R and T against the end of the block 204 on which the blank is positioned. The arms will then be retracted but will not move out of engagement with the tabs until folding mechanism has engaged and moved the flap N inwardly to a sufficient extent to prevent the tabs from moving outwardly to their initial position.

The mechanism for folding the end flaps N and P is particularly illustrated in Figs. 5, 6, 15 and 16. The flap M is folded by a pair of fingers 320 and 321 carried by arms 322 and 323, which in turn are mounted on a sleeve 324 rotatably mounted on a post 325. The sleeve and arms carried thereby are actuated in an anticlockwise direction, viewing Figs. 15 and 16, by a spring 326 connected at one end to the sleeve and at the other end to the post 325. The movement of the sleeve and arms is limited by a suitable stop in such a manner that the arms will normally be disposed parallel to the sides of the form block and the fingers 320 and 321 will be disposed parallel to the ends of the form block when the fingers are disposed in their normal position. It will be noted from the showing in Figs. 15 and 16 that the fingers 320 and 321 are spaced inwardly from the outer ends of the arms 322 and 323, so that the ends of the arms will be positioned against the back of the carton and block when the fingers are disposed in position against the flap N and front of the block.

The post 325 is mounted on a boss 320 which is secured to and depends downwardly from a bar 331 which is slidably mounted in a guideway 332 carried by the upper surface of the frame member W. The bar 331 has pivotally connected thereto a link 333 which is pivoted by a pin 334 to an arm 335 mounted on a fixed pivot 336. In the form of the invention shown, the pin 334 has a sleeve 340 mounted thereon, to which the arm 335 is connected. The pin also has a sleeve 341 mounted thereon to the upper end of which is connected one end of a link 342, the opposite end of the link being connected to a crank 343 secured to the upwardly extending upper end of the shaft 307. As the shaft 307 rotates the crank 343, the connecting rod or link 341 will be oscillated, thus swinging the arm 335 about its pivot 336, and by the link connection 333 between the pin 334 and the bar 331, causing the bar to reciprocate in the guideway 332. As the bar moves into the guideway, the fingers 320 and 321 will engage the flap N and fold it against the end of the block.

The other end flap P is folded by means of a roller 350 which is carried by a lever 351 mounted on a pivot 352. The lever extends upwardly from the pivot and the upper end is connected to one end of a pitman 353. The rear end of the pitman 353 is bifurcated and straddles the shaft 307 and has connected thereto and extending upwardly therefrom, a roller 354 which is disposed in a cam groove 355 formed in a cam 356 mounted on the shaft 307. As the shaft 307 is rotated, the cam will cause the pitman 353 to oscillate, thus swinging the lever 351 about its pivot 352 and causing the roller 350 to engage and fold the flap P. Attention is directed to Fig. 16, which shows the roller operating to fold the flap. As soon as the flap P has been folded to a sufficient extent to hold the flap N in position, the fingers 320 and 321 are backed away or moved away from the flap N. In order to prevent the arms 322 and 323, and the fingers 320 and 321 from interfering with the upward movement of the next succeeding form block and wrapper or blank, means is provided for swinging the arms and fingers about the shaft or post 325 as an axis. This means consists of a roller 360 carried by a pin 361 disposed at the lower end of an arm 362 pivoted on a shaft 363. The arm 362 is connected by a link 364 to the pivotal connection 365 between the pitman 353 and the upper end of the lever 351. It will thus be seen that as the roller 350 moves inwardly to fold the flap P, the fingers 320, 321 and the arms 322, 323 will be moved outwardly and at the same time the roller 360 will be swung to the dotted line position shown in Fig. 15, into the path of the outwardly moving arms.

The carrier wheel C is given a fast and slow movement, by means of the mechanism shown at 50 in Fig. 1 and illustrated more in detail in Figs. 17 and 18. The slow movement takes place when the form blocks and blanks are being transferred from the carrier arms to the guideway and are being transferred from the guideway to the carrier arms at the other end of the machine. Intermediate these transfer points the carrier wheel is given a fast movement. In Fig. 18 the shaft 48 is shown as driven by the sprocket chain 52 and has connected thereto a disk 370. The disk 370 is connected by a link 371 to a disk 372 mounted on the shaft 47. Shaft 47 drives the gear 45 on the carrier shaft through gear 46. The drive above described from the shaft 48 to the shaft 47 through the disks and the link connections operates in the well known manner to give a fast and slow rotary movement to the carrier C.

Means is provided for exerting pressure on the folded ends of the boxes as they are fed through the guideway. This means consists of a presser foot 375 (see Figs. 4, 10, 12 and 13). The presser foot is carried by an arm 376 mounted on a shaft 377, on which is also mounted an arm 378 provided with a roller 379 which engages a cam 380 carried by the shaft 302. As each form block and carton thereon reaches a position in the guideway opposite the presser foot 375, the cam 380 will actuate the presser foot in a direction against the folded end of the carton, thus firmly pressing these parts against the end of the block. The blocks then move to the next position in which the spring pressed plate 248 presses against the closed end of the carton.

Means is also provided for exerting pressure on the section G and flap V of the folded carton as the cartons and blocks on which they are mounted pass through the guideway. This is accomplished by means of a toggle connection to the hinged bar 232.

The toggle connection comprises a link 385 which is pivotally connected at 386 to the end of the bar 232 remote from the pivot 233 thereof. The link is connected at its opposite end to a pin 387 carried by an arm 388 mounted on the shaft 363. This shaft also has connected thereto an arm 389 which is actuated by a pitman 390. The pitman 390 has a forked end 391 which straddles the shaft 56 and has a roller 393 positioned in the groove 394 formed in the cam 285 on the shaft 56. As the cam rotates, the pitman 390 will be oscillated, causing the toggle formed by the arm 388 and link 385 to alternately lower and raise the bar 282, thus exerting a downward pressure on the cartons and blocks on which they are mounted. This pressure, in addition to being communicated through the resiliently mounted plates 240 and 230, is more positively communicated by means of a cross bar 398 which is carried by the bell or arm 232 and is disposed in a position to engage the outer surface of the section G of the blank as the form blocks and cartons pass beneath the bar 398 and between the plate 240 and the plate 230.

*Carton ejecting or discharge mechanism*

After the form blocks and cartons thereon have passed through the transverse horizontal guideways, they are again placed on the ends of the carrier arms and are fed downwardly to a position in which the cartons are engaged by the ejecting mechanism. Attention is directed to Figs. 2, 5 and 11. Before the form blocks can be replaced on the carrier, the latches 199 are tilted on their pivots, as shown in Figs. 2 and 11, by a tripping bar 400 carried by the frame of the machine and disposed in position to engage the rollers 201. When the outer end of each arm reaches a position opposite the discharge end of the guideway, the pressure of the plunger at the opposite end of the guideway will be transmitted through the intermediate blocks and will force the end block onto the arm disposed in alinement with the guideway. It will be seen from the showing, particularly in Fig. 11, that the lug 195 on the outer face of each arm is disposed adjacent the upper edge of the face at the receiving end of the guideway and is disposed at the lower edge of the face at the discharge end of the guideway. For this reason, as hereinbefore explained, the end of the block is provided with a pair of V-shaped notches 205 and 206. It will also be noted that one of the notches faces in the one direction and the other faces in the opposite direction. Thus at one end of the guideway the lug 195 will engage one of the notches and at the opposite end of the guideway the block will be forced on the supporting portion of the arm with the other notch engaging the lug.

In order to insure the blocks being forced entirely on the supporting arms, a roller 401 is carried by the guideway supporting frame and is disposed in position to engage either one of a pair of laterally projecting lugs 207 and 208. This roller insures the positioning of the lug 195 entirely within the notch which receives it.

After the blocks and the cartons thereon have been replaced on the arms of the carrier, the carrier moves in a clockwise direction, viewing Fig. 11, to the ejecting mechanism. This mechanism is supported on the bracket or post 405 which is carried by the table or bed plate 25. The ejecting mechanism is carried by a frame comprising side plates 406 and 407 and a cross or intermediate plate 408. This mechanism comprises a pair of friction rollers 410 and 411 carried by posts 412 and 413, which in turn are mounted on and extend downwardly from lever arms 415 and 416 which form parts of bell crank levers mounted on fixed pivots 417 and 418. One of the bell crank levers has its other arm 419 bifurcated and the corresponding arm 420 of the other bell crank lever has a stud or roller projecting laterally therefrom and disposed in the bifurcated or forked end of the arm 419.

Friction rollers 410 and 411 are moved inwardly and outwardly about the pivots 417 and 418 by a link 425, which is connected by a universal joint 426 to a pitman or connecting rod 427 having a bifurcated upper end embracing the shaft 302 and a roller 428 disposed in a cam groove 429 formed in the cam 430 mounted on the shaft 302. The lower end of the link 425 is pivotally connected to a lug 431 secured to and projecting laterally from the lever arm 415. As the cam rotates, the roller connecting rod and link will cause the friction rollers 410 and 411 to move inwardly into a position to engage a carton on one of the form blocks and these rollers will be rotated in a manner hereinafter described in the direction of the arrows shown in Fig. 14 to eject the carton from the form block.

The rollers are rotated in the following manner: A separate motor Z is mounted on the table 25 and the motor shaft has a pulley 440 thereon. A belt 441 is driven by the pulley and passes around an idler 442 supported on a bracket 443 and around a grooved pulley 444 mounted on the frame of the ejecting mechanism. A second pulley 445 is fixed to the pulley 444 and a belt 446 engages the pulley 445, passes around a pulley 447 mounted on the spindle or post 412 which carries the roller 410, thence passes around an idler pulley 448 mounted on the axis of the pulleys 444 and 445, and from the idler pulley 448 the belt 446 passes around a pulley 450 mounted on the spindle or post 413 which carries the friction roller 411. The belt 441 after passing around the pulley 444 is led downwardly over a second idler pulley on the axis of the idler pulley 442 and around the motor driven pulley 440.

The ejecting mechanism operates as follows: As above stated, the form blocks and cartons are replaced on the carrier arms at the exit end of the driveway. They are then moved successively to the position shown in Fig. 11 and the cam 430 will actuate the operative connections above described and cause the ejecting rollers 410 and 411 to move inwardly and engage the carton on the block. The operative driving connections from the motor Z will rotate the rollers 410 and 411 in the directions of the arrows shown in Fig. 14 and cause the rollers to remove the carton from the form block. If desired, a suitable chute can be provided to receive the ejected cartons.

Résumé of operation of machine

Without going into detail as to the operation of the various parts of the machine, the operation of the machine will be summarized as follows: The blanks B have adhesive applied to the flaps N and P by the adhesive applying roller 95 and are fed one at a time by the feeding member 130, and the two sets of feed rollers into the path of movement of the form blocks which are mounted on the carrier. During the feeding movement, the sections G of the blanks have adhesive applied thereto by the adhesive applying roller 161. The structure thus far described is shown particularly in Figs. 4, 5, 7, 8 and 9.

From the second set of feed rollers the blanks are fed by the roller 151 and between the roller and plate or bar 150 into the path of movement of the blocks. As the block moves upwardly to the position shown in Fig. 11, the blank is folded around three sides of the block. Thereafter the folding plate 255 folds the flap V against one edge of the block, the block and blank are moved into the guideway to fold flap G, the folding arms 290 and 291 fold the tabs T and R inwardly, the fingers 320 and 321 fold the flap N against the tabs T and R, and the roller 350 carried by the lever 351 folds the flap P against the flap N. These folding operations take place after the block and carton have been moved into the guideway by the plunger 270 and as the form blocks and cartons are successively fed into the guideway, the form blocks and cartons in the guideway are successively moved therethrough. Whenever a form block and carton thereon are fed into the guideway at one end, the form block and carton at the other end of the guideway is ejected therefrom and replaced on one of the carrier arms.

During the passage of the form blocks and cartons through the guideway, downward pressure is exerted thereon by the toggle connection 385, 388 and bar 398 and pressure is exerted against the folded and glued end of the carton by the pressure block 375. Before the blocks are fed into the guideway, the latches 199 are tripped by the bell crank lever in the manner hereinbefore described.

As above stated, whenever a form block is fed into the guideway at one end, the block at the other end is ejected and placed on one of the other arms. The ejected block and carton are then fed into the carton ejecting or discharge mechanism and the carton will be removed from the form block by the ejecting rollers 410 and 411.

From the foregoing description it will be clear that the machine described will operate automatically to fold the blanks into boxes or cartons, close one end of the carton and eject the cartons from the machine in condition for filling. The removal of the cartons from the form blocks, passage thereof through the guideway, and replacement of the cartons on the carrier, materially increases the speed of operation and output of the machine.

Although one specific embodiment of the invention has been particularly shown and described, it will be understood that the invention is capable of modification and that changes in the construction and in the arrangement of the various cooperating parts may be made without departing from the spirit or scope of the invention, as expressed in the following claims.

What I claim is:

1. A machine for making cartons comprising means for supporting a supply of blanks, a carrier, a plurality of form blocks on said carrier, means for feeding said blanks one at a time to said blocks, means for folding the blanks around said blocks, a guideway, means for transferring the blocks and folded blanks from the carrier to said guideway, means for returning the blocks and folded cartons from the guideway to said carrier, and means for removing the cartons from the form blocks.

2. A machine for making cartons comprising means for supporting a supply of blanks, a carrier, a plurality of form blocks on said carrier means for feeding said blanks one at a time to said blocks, means for folding the blanks around said blocks, means for folding one end of the blank around one end of the block, a guideway, means for transferring the blocks and folded blanks from the carrier to said guideway, means for returning the blocks and folded cartons from the guideway to said carrier, and means for removing the cartons from the form blocks.

3. A machine for making cartons comprising means for supporting a supply of blanks, means for applying adhesive to edge portions of said blank, a carrier, a plurality of form blocks on said carrier, means for feeding said blanks one at a time to said blocks, means for folding the blanks around said blocks, a guideway, means for transferring the blocks and folded blanks from the carrier to said guideway, means for returning the blocks and folded cartons from the guideway to said carrier, and means for removing the cartons from the form blocks.

4. A machine for making cartons comprising means for supporting a supply of blanks, a carrier, a plurality of form blocks on said carrier, means for feeding said blanks one at a time into the path of movement of said blocks, means for folding the blanks around said blocks, a guideway, means for transferring the blocks and folded blanks from the carrier to said guideway, means for returning the blocks and folded cartons from the guideway to said carrier, and means for removing the cartons from the form blocks.

5. A machine for making cartons comprising means for supporting a supply of blanks, a carrier, a plurality of form blocks on said carrier, means for feeding said blanks one at a time to said blocks, means for folding the blanks around said blocks, a guideway, means for transferring the blocks and folded blanks from the carrier to said guideway, means for pressing the folded portions of the blank as the blocks are positioned in the guideway, means for returning the blocks and folded cartons from the guideway to said carrier, and means for removing the cartons from the form block.

6. A machine for making cartons comprising a carrier, a plurality of form blocks detachably mounted thereon, means for latching said blocks on the carrier, means for feeding a blank into the path of movement of each block at a predetermined point in said path of movement, a guideway, means for unlatching each block as it reaches a position opposite one end of said guideway, and means for feeding each block and blank thereon into said guideway.

7. A machine for making cartons comprising a carrier, a plurality of form blocks detachably mounted thereon, means for folding a blank around each block, means for folding end portions of each blank against one end of the block, means for removing the blocks and partially folded blanks from the carrier and for returning said blocks and folded cartons to the carrier, and means for removing the folded carton from each block.

8. A machine for making cartons comprising a carrier, a plurality of form blocks detachably mounted thereon, means for folding and securing a blank around each block, means for folding end portions of each blank against one end of the block and securing said end portions, means for removing the blocks and partially folded blanks from the carrier and for returning said blocks and folded cartons to the carrier and means for removing the folded carton from each block.

9. A machine for making cartons comprising means for supporting a supply of blanks, a carrier, a plurality of form blocks on said carrier, means for feeding said blanks one at a time to said blocks, means for folding the blanks around said blocks, a guideway, means for transferring the blocks and folded blanks from the carrier to said guideway, and means for returning the blocks and folded cartons from the guideway to said carrier.

10. A machine for making cartons comprising a carrier, a plurality of form blocks detachably mounted thereon, means for folding a blank around each block, a guideway, means for moving the blocks and folded blanks into the guideway from the carrier, and folding means operative on the blanks as they move into and through the guideway.

11. A machine for making cartons comprising a carrier, a plurality of form blocks detachably mounted thereon, means for folding a blank around each block, a guideway, means for moving the blocks and folded blanks into the guideway from the carrier, folding means operative on the blanks as they move into and through the guideway, and means for transferring the blocks and folded cartons from the guideway to the carrier.

12. A machine for making cartons comprising a carrier, a plurality of form blocks detachably mounted thereon, means for folding a blank around each block, a guideway, means for moving the blocks and folded blanks into the guideway from the carrier, and pressure means acting on the folded blank to secure the folded portions as the block and folded blank move in the guideway.

13. A machine for making cartons comprising a carrier, a plurality of form blocks detachably mounted thereon, means for folding a blank around each block, means for removing the blocks and folded blanks from the carrier, and means for securing the folded portions of the blanks when the blocks are detached from the carrier.

14. A machine for making cartons comprising a carrier, a plurality of form blocks detachably mounted thereon, means for folding a blank around each block, means for removing the blocks and folded blanks from the carrier, means for securing the folded portions of the blanks when the blocks are detached from the carrier, and means for replacing the blocks and folded cartons on the carrier.

15. A machine for making cartons comprising a carrier, a plurality of form blocks detachably mounted thereon, means for folding a blank around each block, and means for removing the blocks and partially folded blanks from the carrier and for returning said blocks and folded cartons to the carrier, certain of said folding operations being effected when the block is removed from the carrier.

16. A machine for making cartons comprising a carrier, a plurality of form blocks detachably mounted thereon, means for folding a blank around each block, folding mechanism, means for moving the blocks and folded blanks into the folding mechanism from the carrier, and folding means operative on the blanks as they move into and through the folding mechanism.

17. A machine for making cartons comprising a rotary carrier, a plurality of form blocks detachably mounted thereon, means for folding a blank around each block, a guideway disposed diametrically of said carrier, means for moving the blocks and folded blanks into the guideway from the carrier, and folding means operative on the blanks as they move into and through the guideway.

18. A machine for making cartons comprising a rotary carrier, a plurality of form blocks detachably mounted thereon, means for folding a blank around each block, a guideway disposed diametrically of said carrier, means for moving the blocks and folded blanks into the guideway from the carrier, folding means operative on the blanks as they move into and through the guideway, and means for transferring the blocks and folded cartons from the guideway to the carrier.

19. A machine for making cartons comprising a rotary carrier, a plurality of form blocks detachably mounted thereon, means for folding a blank around each block, a guideway disposed diametrically of said carrier, means for moving the blocks and folded blanks into the guideway from the carrier, folding means operative on the blanks as they move into and through the guideway, and simultaneously acting means for transferring the blocks and folded cartons from the guideway to the carrier.

20. A machine for making cartons comprising a carrier, a plurality of form blocks removably mounted thereon, means for folding a blank around each block, a guideway, means for moving the blocks and folded blanks, one at a time, from the carrier to the guideway and for simultaneously moving the blocks and folded cartons, one at a time, from the guideway to the carrier, and means in said guideway for folding and securing portions of the blank during its passage through the guideway.

21. A machine for making cartons comprising a carrier, a plurality of form blocks removably mounted thereon, means for folding a blank around each block, a guideway, means in said guideway for folding and securing portions of the blank during its passage through the guideway, and means for simultaneously transferring said blocks, one at a time, from the carrier into one end of the guideway and transferring the blocks, one at a time, from the other end of the guideway to the carrier.

22. A machine for making cartons comprising a carrier, a plurality of form blocks detachably mounted thereon, means for folding a blank around each block, latching means for retaining the blocks on the carrier, means for releasing said latching means, means for removing the blocks and folded blanks from the carrier after the blocks have been released, and means for securing the folded portions of the blanks when the blocks are detached from the carrier.

JOHN VAN BUREN.